US 9,829,097 B2

(12) United States Patent
Terai

(10) Patent No.: US 9,829,097 B2
(45) Date of Patent: Nov. 28, 2017

(54) SHIFT-BY-WIRE CONTROL DEVICE

(71) Applicant: Fuji Jukogyo Kabushiki Kaisha, Tokyo (JP)

(72) Inventor: Koichiro Terai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/390,122

(22) Filed: Dec. 23, 2016

(65) Prior Publication Data
US 2017/0241544 A1 Aug. 24, 2017

(30) Foreign Application Priority Data

Feb. 24, 2016 (JP) ................................. 2016-033506

(51) Int. Cl.
| | | |
|---|---|---|
| *F16H 59/50* | (2006.01) | |
| *F16H 61/12* | (2010.01) | |
| *F16H 61/32* | (2006.01) | |

(52) U.S. Cl.
CPC ............. *F16H 61/12* (2013.01); *F16H 59/50* (2013.01); *F16H 61/32* (2013.01);
(Continued)

(58) Field of Classification Search
CPC .......... F16H 59/50; F16H 61/12; F16H 61/16; F16H 2061/1284; F16H 2312/12
See application file for complete search history.

(56) References Cited

U.S. PATENT DOCUMENTS

| 5,015,991 A | * | 5/1991 | Barr | ................ | B60Q 9/001 |
| | | | | | 340/438 |
| 5,760,683 A | * | 6/1998 | Barr | ................ | E05B 77/54 |
| | | | | | 200/61.88 |

(Continued)

FOREIGN PATENT DOCUMENTS

| JP | 2003-156140 A | 5/2003 |
| JP | 2007-170546 A | 7/2007 |

(Continued)

OTHER PUBLICATIONS

Japanese Office Action dated May 23, 2017 in Japanese Application No. 2016-033506 with and English translation thereof.

*Primary Examiner* — Edwin A Young
(74) *Attorney, Agent, or Firm* — McGinn IP Law Group, PLLC

(57) ABSTRACT

A shift-by-wire control device includes a first detector, a second detector, an auto parking control unit, and a malfunction determining unit. The first and second detectors respectively detect first and second vehicle states attributed to behaviors of a driver. The auto parking control unit executes an auto parking control irrespective of a state of the shift range selected by the shift lever, on conditions that detection results derived from the first and second detectors satisfy respective predetermined conditions. The malfunction determining unit determines that the first detector is malfunctioning, on a condition that the first detector fails to detect a change in the first vehicle state. The auto parking control unit refrains from executing the auto parking control, on a condition that the first detector is determined by the malfunction determining unit as malfunctioning.

2 Claims, 4 Drawing Sheets

(52) U.S. Cl.
CPC .............. *F16H 2061/1284* (2013.01); *F16H 2061/326* (2013.01); *F16H 2312/12* (2013.01)

(56) References Cited

U.S. PATENT DOCUMENTS

| | | | |
|---|---|---|---|
| 2013/0252784 A1* | 9/2013 | Kinoshita | B60W 10/182 477/92 |
| 2013/0252785 A1* | 9/2013 | Kinoshita | B60K 28/12 477/97 |
| 2013/0275016 A1 | 10/2013 | Mitani et al. | |

FOREIGN PATENT DOCUMENTS

| | | |
|---|---|---|
| JP | 2013-155775 A | 8/2013 |
| JP | 2013-199963 A | 10/2013 |
| JP | 5488720 B | 5/2014 |

* cited by examiner

SHIFT-BY-WIRE CONTROL DEVICE

CROSS-REFERENCE TO RELATED APPLICATIONS

The present application claims priority from Japanese Patent Application No. 2016-033506 filed on Feb. 24, 2016, the entire contents of which are hereby incorporated by reference.

BACKGROUND

The technology relates to an automatic transmission that utilizes a shift-by-wire system in which shift ranges are automatically switched with use of an actuator. In particular, the technology relates to a shift-by-wire control device that compulsorily switches any shift range to a parking range in response to a state of a vehicle.

A vehicle automatic transmission may utilize a shift-by-wire system in which shift ranges may be automatically switched with use of an electric actuator such as a solenoid. Non-limiting examples of the shift ranges may include a drive (D) range, a reverse (R) range, a neutral (N) range, and a parking (P) range. For such an automatic transmission, for purpose of improving safety, an auto parking control technique is known that involves compulsorily switching any shift range to the parking range, on a condition that the shift range is set to other than the parking range when a driver stops a vehicle and leaves the vehicle.

For example, Japanese Unexamined Patent Application Publication (JP-A) No. 2013-199963 discloses a technique in which any shift range is compulsorily switched to the parking range by determining that a vehicle is in preparation for stopping, on conditions that opening of a door at a driver's seat is detected and an unfastened state of a seat belt of a driver is detected. JP-A No. 2003-156140 discloses a technique in which any shift range of a vehicle is compulsorily shifted to the parking range, on a condition that driver's action of leaving a vehicle is detected, for example. For purposes of preventing erroneous operation and improving safety, JP-A No. 2007-170546 discloses a technique in which any shift range is switched to the parking range, on conditions that a vehicle speed is less than a predetermined speed, an unfastened state of a seat belt by a driver is detected, and a load applied onto a driver's seat is equal to or less than a predetermined value, for example.

SUMMARY

In the techniques disclosed in JP-A Nos. 2013-199963, 2003-156140, and 2007-170546 described above, there is a possibility that the shift range may be compulsorily switched to the parking range when, without limitation, malfunction occurs for some reason to a seat belt switch that detects the unfastened state of the seat belt. In other words, under circumstances where, without limitation, the seat belt switch still continues to detect the unfastened state despite a fastened state of the seat belt, simply opening a door may cause the shift range to be compulsorily switched to the parking range.

For example, when a driver reverses a vehicle with a door open while visually checking in a backward direction, the opening of the door may not cause the shift range to be switched to the parking range if the seat belt is in the fastened state. This ensures convenience in driving. But if the seat belt switch should malfunction and keep on detecting the unfastened state, solely opening the door may cause the shift range to be switched to the parking range, leading to inhibition of reversing of the vehicle, although the driver considers it possible to reverse the vehicle with the door open only if the driver wears the seat belt.

It is desirable to provide a shift-by-wire control device that makes it possible to ensure convenience in driving.

An aspect of the technology provides a shift-by-wire control device that drives, on a basis of an electrical signal corresponding to a shift range selected by a shift lever, an actuator to perform a shift change. The shift-by-wire control device includes a first detector, a second detector, an auto parking control unit, and a malfunction determining unit. The first detector detects a first vehicle state attributed to a behavior of a driver. The second detector detects a second vehicle state, in which the second vehicle state is attributed to a behavior of the driver and is different from the first vehicle state. The auto parking control unit executes an auto parking control irrespective of a state of the shift range selected by the shift lever, on conditions that a detection result derived from the first detector and a detection result derived from the second detector satisfy respective predetermined conditions, in which the auto parking control allows the state of the shift range to be switched to a parking range. The malfunction determining unit determines the first detector is malfunctioning, on a condition that the first detector fails to detect a change in the first vehicle state. The auto parking control unit refrains from executing the auto parking control on a condition that the first detector is determined by the malfunction determining unit as malfunctioning.

The first detector may be a seat belt switch that detects a fastened state of a seat belt by the driver. The second detector may be a door switch that detects an open state or a closed state of a door of a vehicle. The malfunction determining unit may determine that the seat belt switch is malfunctioning, on a condition that the malfunction determining unit senses no change in the detection result derived from the seat belt switch, during a time period from a timing at which the driver enters the vehicle up to a timing at which a running speed of the vehicle reaches a predetermined speed.

DETAILED DESCRIPTION

Figure 1:
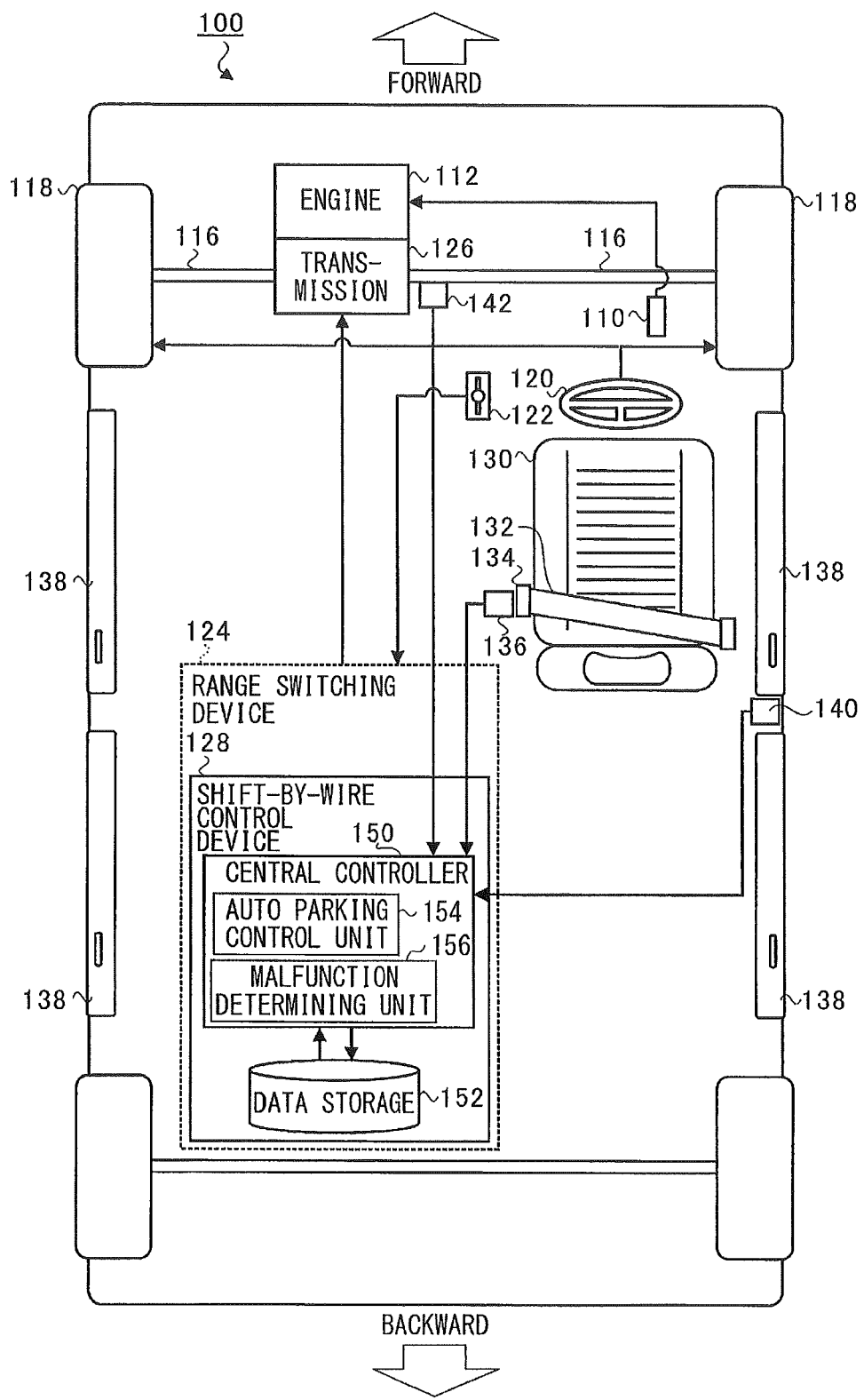
FIG. 1 describes an overall configuration of a vehicle.

In the following, some preferred implementations of the technology are described in detail with reference to the accompanying drawings. Note that sizes, materials, specific values, and any other factors illustrated in respective implementations are illustrative for an easier understanding of the technology, and are not intended to limit the scope of the technology unless otherwise specifically stated. Throughout the present specification and the drawings, elements having substantially the same function and configuration are denoted with the same reference numerals to avoid any redundant description. Also, elements that are not directly related to the technology are unillustrated in the drawings.

(Vehicle 100)

FIG. 1 describes an overall configuration of a vehicle 100. Operation of an accelerator pedal 110 by a driver may cause power of an engine 112 in accordance with an amount of the operation to be transmitted to one or more drive wheels 118 through a transmission 126 and a drive shaft 116. Operation of a steering wheel 120 by the driver may cause an amount of the operation to be transmitted to the one or more drive wheels 118, which allows for steering of the vehicle 100.

Operation of a shift lever 122 by the driver may cause a range switching device 124 to switch a transmission range of the transmission 126 to a transmission range that corresponds to a shift range selected by the shift lever 122. The operation of the shift lever 122 by the driver may also cause the number of revolutions and torque of the engine 112 to be converted to the number of revolutions and torque that are suitable for running. The shift lever 122 may be disposed near a driver's seat. The transmission 126 may be an automatic transmission such as a continuously variable transmission or a planetary gear step automatic transmission (AT). Transmission ranges may include, for example, a drive (D) range, a reverse (R) range, a neutral (N) range, and a parking (P) range.

The range switching device 124 may be of a so-called shift-by-wire system in which the shift change is performed solely on a basis of an electrical signal, instead of being of a system in which the shift change is performed on a basis of a linkage mechanism mechanically connected with the shift lever 122. More specifically, the range switching device 124 may include an undepicted manual valve, an undepicted parking lock mechanism, undepicted electric actuators, and the shift-by-wire control device 128. The manual valve may selectively supply hydraulic pressure to a forward clutch or a reverse clutch. The parking lock mechanism may mechanically lock an output shaft of the transmission 126. The actuators may drive the manual valve and the parking lock mechanism through devices such as, but not limited to, motors and solenoids. The shift-by-wire control device 128 may control driving of the actuators.

The shift-by-wire control device 128 may detect, with use of a range switch, a range position selected by the shift lever 122, and drive the actuators in response to a detection result derived from the range switch to perform the following example control. The D range may include engaging the forward clutch and disengaging the reverse clutch. The R range may include disengaging the forward clutch and engaging the reverse clutch. The N range may include disengaging both the forward clutch and the reverse clutch. The P range may include disengaging both the forward clutch and the reverse clutch, and actuating the parking lock mechanism. The shift lever 122 may be provided with a self-returning mechanism that causes the shift lever 122 to return to a predetermined home position automatically after the driver has finished operating the shift lever 122.

A seat belt 132 may be provided around the driver's seat 130. The seat belt 132 may be provided with an anchor 134, and adapted to constrain a body of the driver to the driver's seat 130. The anchor 134 may be provided with a seat belt switch 136. The seat belt switch 136 may detect that the driver fastens the seat belt 116 (defined as a "fastened state") upon fastening of the seat belt 116 by the driver, and detect that the driver does not fasten the seat belt 116 (defined as an "unfastened state") upon non-fastening of the seat belt 116 by the driver.

Doors 138 may be provided on sides of the vehicle 100. The doors 138 may allow occupants including the driver to enter and leave the vehicle 100. A door switch 140 may be provided around the door 138 located at the driver's seat 130. The door switch 140 may detect that the door 138 located at the driver's seat 130 is open (defined as an "open state"), and detect that the door 138 located at the driver's seat 130 is closed (defined as a "closed state").

A vehicle speed sensor 142 may be provided around the drive shaft 116. The vehicle speed sensor 142 may detect a running speed of the vehicle 100.

(Shift-By-Wire Control Device 128)

The shift-by-wire control device 128 may include a central controller 150 and a data storage 152. The central controller 150 may include a semiconductor integrated circuit, and control the shift-by-wire control device 128 as a whole. The semiconductor integrated circuit may have devices such as, but not limited to, a central processing unit (CPU), ROM in which programs, etc., are stored, and RAM serving as a work area. The central controller 150 may function as, or may have, an auto parking control unit 154 and a malfunction determining unit 156, which are to be described later. The data storage 152 may include a memory such as, but not limited to, RAM, a flash memory, and HDD, and store various pieces of information necessary for processing performed by the central controller 150.

The auto parking control unit 154 may perform a so-called auto parking control. The auto parking control may involve compulsorily switching of the shift ranges from any shift range other than the parking range to the parking range, on conditions that the seat belt switch 136 detects the unfastened state of the seat belt 132 and the door switch 140 detects the open state of the door 138 at the driver's seat 130, when the driver stops the vehicle 100 and leaves the vehicle 100. Here, the seat belt switch 136 and the door switch 140 may serve as exemplification of a switch, a sensor, or any other equivalent that detects a state of the vehicle 100. Thus, the auto parking control allows for prevention of the driver's erroneous operation, and contributes to enhancement in safety.

However, there is a possibility that the shift range may be compulsorily switched to the parking range if, without limitation, malfunction should occur for some reason to the seat belt switch 136. In other words, under circumstances where, without limitation, the seat belt switch 136 should still continue to detect the unfastened state despite the fastened state of the seat belt 132, solely opening the door 138 may cause the shift range to be compulsorily switched to the parking range. For example, when the driver reverses the vehicle 100 with the door 138 open while visually checking in a backward direction, the opening of the door 138 may not cause the shift range to be switched to the parking range, if the seat belt 132 is in the fastened state. This ensures convenience in driving. But if the seat belt switch 136 should malfunction and continue to detect the unfastened state, solely opening the door 138 may cause the shift range to be switched to the parking range, leading to inhibition of reversing of the vehicle 100, although the driver considers it possible to reverse the vehicle 100 with the door 138 open only if the driver wears the seat belt 132.

This implementation, therefore, may involve determining malfunction of the switch, the sensor, or any other equivalent (here, the seat belt switch 136) that detects the state of the vehicle 100, and keeping the shift range from being easily switched to the parking range. Hence, it is possible to ensure the convenience in driving.

The malfunction determining unit 156 may determine that the switch, the sensor, or any other equivalent (each of which may be a non-limiting example of a "first detector") that detects a vehicle state attributed to a behavior of a driver is malfunctioning, on a condition that the "first detector" fails to detect a change in the vehicle state despite an occurrence of the change in the vehicle state supposed to be detected by the "first detector". A description is given here of this implementation by referring to a non-limiting example in which the seat belt switch 136 serves as the "first detector" to be subjected to the determination on malfunctioning. More specifically, the malfunction determining unit 156 may determine that the seat belt switch 136 is malfunctioning, on a condition that the malfunction determining unit 156 senses no single change in a detection result derived from the seat belt switch 136, during a time period from a timing at which the driver enters the vehicle 100 up to a timing at which a running speed of the vehicle 100 reaches a predetermined speed. The predetermined speed may be, for example, 20 km/h without limitation. The "change in the detection result derived from the seat belt switch 136" may be, for example, a change from the unfastened state to the fastened state. Note that the "vehicle state attributed to a behavior of a driver" detected by the first detector may be an example of a "first vehicle state".

Figure 2:
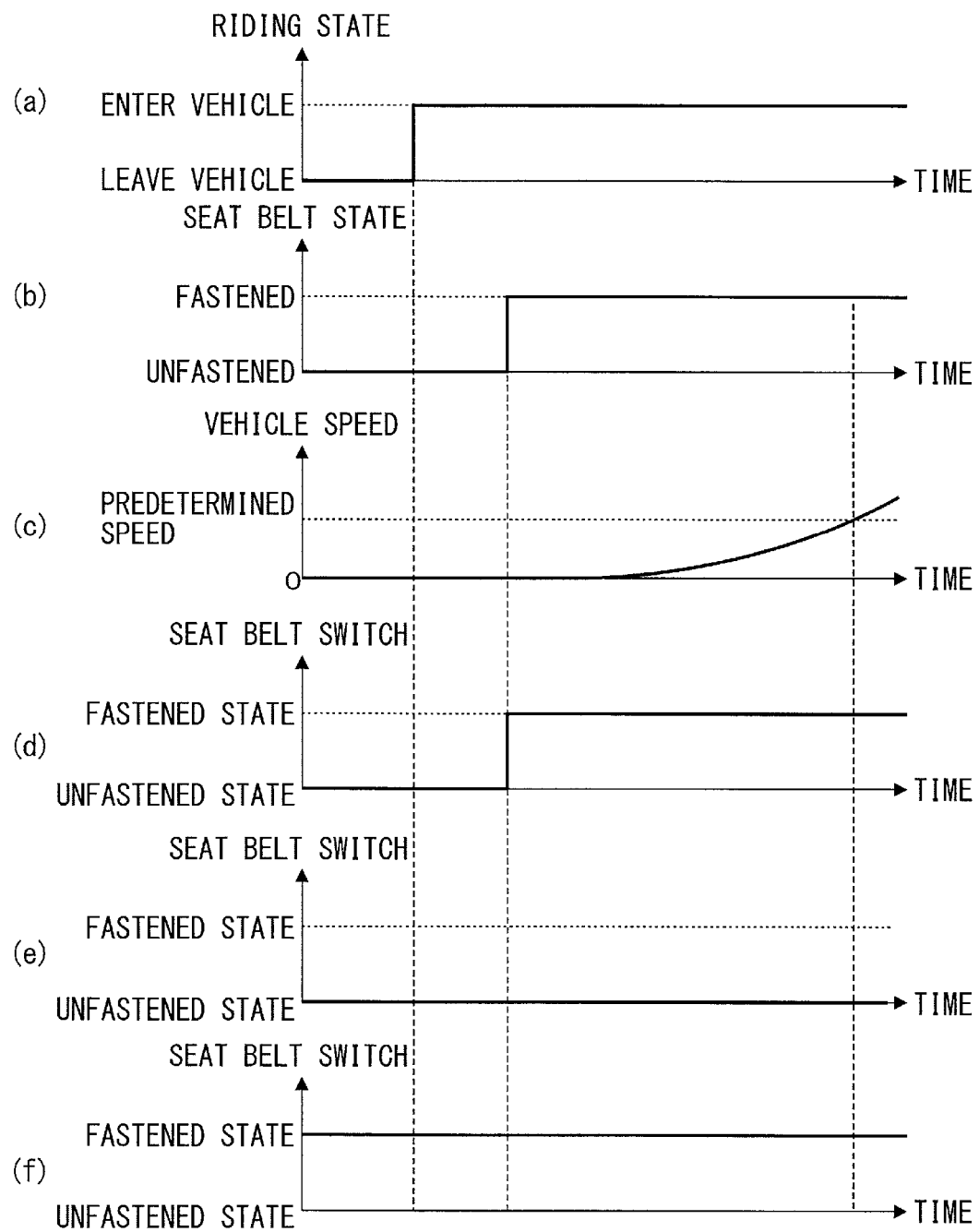
FIG. 2 describes transitions of states of the vehicle, and transitions of detection results derived from a seat belt switch.

FIG. 2 describes transitions of states of the vehicle 100, and transitions of the detection results derived from the seat belt switch 136. Specifically, (a) of FIG. 2 illustrates a transition of a riding state of the driver on the vehicle 100, i.e., a transition between a state in which the driver enters the vehicle 100 and a state in which the driver leaves the vehicle 100. (b) of FIG. 2 illustrates a transition of a state of the seat belt 132, i.e., a transition between the fastened state and the unfastened state. (c) of FIG. 2 illustrates a transition of the running speed of the vehicle 100, i.e., a transition between zero (0) and the predetermined speed. (d) to (f) of FIG. 2 each illustrate the transition of the detection result derived from the seat belt switch 136. Here, (d) to (f) of FIG. 2 each illustrate the transition between the fastened state and the unfastened state of the seat belt switch 136 upon fastening of the seat belt 132 by the driver at any timing from the entering of the driver into the vehicle 100 up to the reaching of the running speed of the vehicle 100 to the predetermined speed.

Referring to (d) of FIG. 2, the detection result derived from the seat belt switch 136 may make a transition from the unfastened state to the fastened state at the timing of fastening the seat belt 132, under a circumstance in which the seat belt switch 136 operates normally. This may allow the malfunction determining unit 156 to sense the change in the detection result of the seat belt switch 136, and the malfunction determining unit 156 may thus determine that the seat belt switch 136 is not malfunctioning.

On the other hand, under a circumstance in which the seat belt switch 136 is malfunctioning and thus fixed in the unfastened state, the detection result derived from the seat belt switch 136 may fail to make the transition from the unfastened state to the fastened state and thus keep on indicating the unfastened state as illustrated in (e) of FIG. 2, even when the driver fastens the seat belt 132. Hence, the malfunction determining unit 156 may not sense the change in the detection result of the seat belt switch 136 during the time period from the entering of the driver into the vehicle 100 up to the reaching of the running speed of the vehicle 100 to the predetermined speed, and thus determine that the seat belt switch 136 is malfunctioning. Note that the malfunction in which the seat belt switch 136 is fixed in the unfastened state is referred to as an "unfastened state fixed malfunction".

Likewise, under a circumstance in which the seat belt switch 136 is malfunctioning and thus fixed in the fastened state, the detection result derived from the seat belt switch 136 may keep on indicating the fastened state even before the driver enters the vehicle 100 or fastens the seat belt 132, and the fastened state may not change even when the driver fastens the seat belt 132 as illustrated in (f) of FIG. 2. Hence, the malfunction determining unit 156 may not sense the change in the detection result of the seat belt switch 136 during the time period from the entering of the driver into the vehicle 100 up to the reaching of the running speed of the vehicle 100 to the predetermined speed, and thus determine that the seat belt switch 136 is malfunctioning. Note that the malfunction in which the seat belt switch 136 is fixed in the fastened state is referred to as a "fastened state fixed malfunction". In the following, a description is given of one specific but non-limiting flow of a determination process performed by the malfunction determining unit 156.

Note that, in the event of the occurrence of the malfunction in which the seat belt switch 136 is fixed in the unfastened state or has the "unfastened state fixed malfunction", the seat belt switch 136 may still continue to detect the state as the unfastened state even when the driver fastens the seat belt 132 (i.e., even when the state is placed into the fastened state), meaning that any shift range may be switched to the parking range. Hence, the malfunction determining unit 156 may determine, as malfunction, only a state in which the seat belt switch 136 is fixed in the unfastened state as illustrated in (e) of FIG. 2, without determining, as malfunction, a state in which the seat belt switch 136 is fixed in the fastened state.

[Determination Process performed by Malfunction Determining Unit 156]

Figure 3:
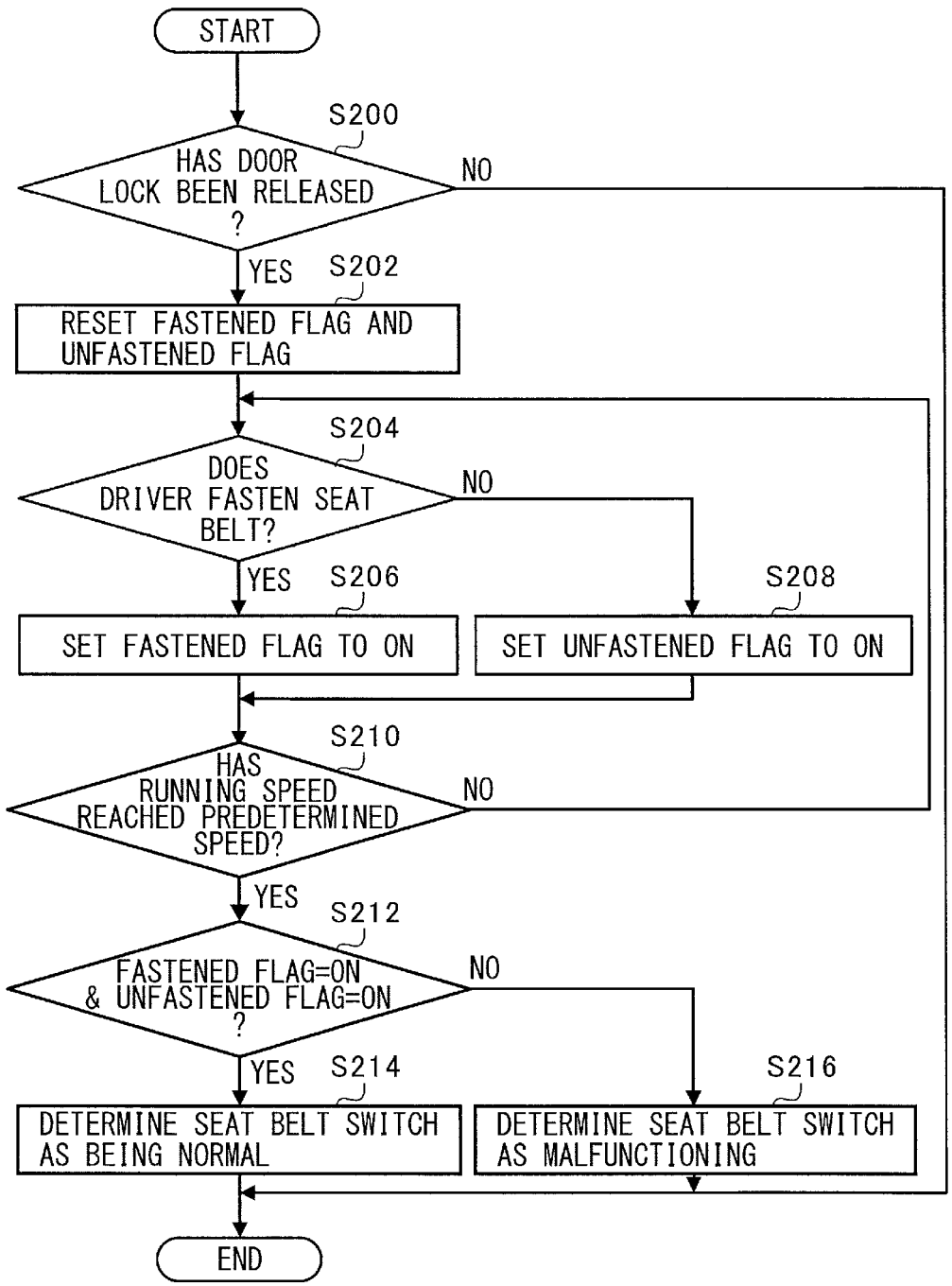
FIG. 3 is a flowchart illustrating a determination process performed by a malfunction determining unit.

FIG. 3 is a flowchart that illustrates a determination process performed by the malfunction determining unit 156. Referring to FIG. 3, the malfunction determining unit 156 may first determine whether or not a driver has entered the vehicle 100, on a basis of determination on whether or not a door lock of the door 138 has been released (S200). When the malfunction determining unit 156 determines that the door lock has been released (YES in S200), the malfunction determining unit 156 may reset a fastened flag and an unfastened flag to OFF (S202). Meanwhile, when the malfunction determining unit 156 determines that the door lock has not been released (NO in S200), the malfunction determining unit 156 may end the determination process performed by the malfunction determining unit 156. As used herein, the term "fastened flag" refers to a flag that indicates whether or not the seat belt switch 136 has detected the fastened state, in which "ON" indicates that the fastened state has been detected, and "OFF" indicates that the fastened state has not been detected. The term "unfastened flag" refers to a flag that indicates whether or not the seat belt switch 136 has detected the unfastened state, in which "ON" indicates that the unfastened state has been detected, and "OFF" indicates that the unfastened state has not been detected.

Thereafter, the malfunction determining unit 156 may determine whether or not the seat belt switch 136 has detected the fastened state (S204). When the seat belt switch 136 detects the fastened state (YES in S204), the malfunction determining unit 156 may set the fastened flag to ON (S206). Meanwhile, when the seat belt switch 136 does not detect the fastened state (NO in S204), the malfunction determining unit 156 may set the unfastened flag to ON (S208).

Thereafter, the malfunction determining unit 156 may determine whether or not the running speed of the vehicle 100 has reached the predetermined speed (S210). When the running speed of the vehicle 100 has not reached the predetermined speed (NO in S210), the malfunction determining unit 156 may repeat the processes from the fastened state determining step (S204). Meanwhile, when the running speed of the vehicle 100 has reached the predetermined speed (YES in S210), the malfunction determining unit 156 may determine whether or not the fastened flag and the unfastened flag have been both set to ON (S212). When both the fastened flag and the unfastened flag have been set to ON (YES in S212), the malfunction determining unit 156 may determine that the seat belt switch 136 is not malfunctioning, i.e., is normal (S214), because there is the change in the fastened state. Thus, the malfunction determining unit 156 may end the determining process performed by the malfunction determining unit 156. Meanwhile, when one or both of the fastened flag and the unfastened flag have been set to OFF (NO in S212), the malfunction determining unit 156 may determine that the seat belt switch 136 is malfunctioning (S216), and end the determining process performed by the malfunction determining unit 156.

[Auto Parking Control]

The auto parking control unit 154 may execute the auto parking control, on the basis of detection results derived from the respective switches, sensors, or their equivalents that detect corresponding vehicle states attributed to respective behaviors of the driver. A description is given here of this implementation by referring to a non-limiting example in which the auto parking control unit 154 may execute the auto parking control, on the basis of detection results derived from the seat belt switch 136 and the door switch 140. More specifically, the auto parking control unit 154 may execute the auto parking control that may involve switching any shift range to the parking range, on conditions that the seat belt 132 is not fastened by the driver and the door 138 at the driver's seat 130 is open, i.e., the seat belt switch 136 has detected the unfastened state and the door switch 140 has detected that the open state. In one implementation of the technology, the state in which the door 138 at the driver's seat 130 is open may serve as a "second vehicle state". In one implementation of the technology, the door switch 140 may serve as a "second detector".

Note that the occurrence of the malfunction of the seat belt switch 136 for some reason may cause the auto parking control unit 154 to compulsorily switch any shift range to the parking range, solely upon the opening of the door 138. For example, under circumstances where, without limitation, the seat belt switch 136 still continues to detect the unfastened state (i.e., the occurrence of the unfastened state fixed malfunction) despite the fastening of the seat belt 132 by the driver (i.e., the fastened state) as described above, there is a possibility that the auto parking control unit 154 may compulsorily switch any shift range to the parking range, solely upon the opening of the door 138. This implementation, therefore, involves allowing the auto parking control unit 154 to execute the auto parking control, on the basis of the determination result derived from the malfunction determining unit 156, in addition to the detection result derived from any switch, sensor, or equivalent.

More specifically, the auto parking control unit 154 refrains from executing the auto parking control when the seat belt switch 136 is determined by the malfunction determining unit 156 as malfunctioning, irrespective of the detection results derived from the seat belt switch 136 and the door switch 140. In one implementation of the technology, the seat belt switch 136 may serve as the first detector, and the door switch 140 may be a non-limiting example of a "second detector".

Figure 4:
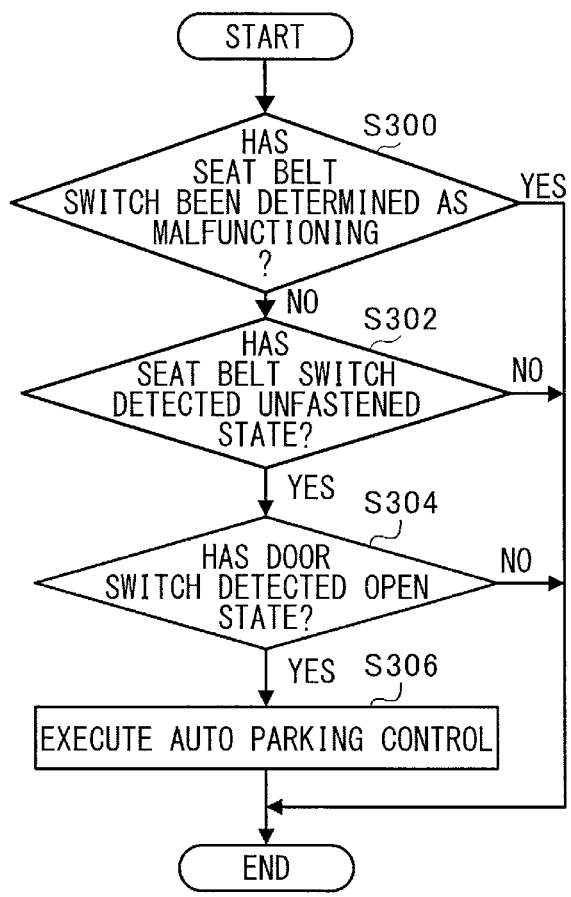
FIG. 4 is a flowchart illustrating a process performed by an auto parking control unit.

FIG. 4 is a flowchart that illustrates a process performed by the auto parking control unit 154. First, the auto parking control unit 154 may determine whether or not the malfunction determining unit 156 has detected the malfunction of the seat belt switch 136 (S300). When the auto parking control unit 154 determines that the malfunction of the seat belt switch 136 has not been detected (NO in S300), the auto parking control unit 154 may determine whether or not the seat belt switch 136 has detected the unfastened state (S302).

When the auto parking control unit 154 determines that the seat belt switch 136 has detected the unfastened state (YES in S302), the auto parking control unit 154 may determine whether or not the door switch 140 has detected the open state (S304). When the auto parking control unit 154 determines that the door switch 140 has detected the open state (YES in S304), the auto parking control unit 154 may execute the auto parking control (S306), and end the process performed by the auto parking control unit 154.

Meanwhile, when the auto parking control unit 154 determines that the malfunction determining unit 156 has detected the malfunction of the seat belt switch 136 (NO in S300), the auto parking control unit 154 may end the process performed by the auto parking control unit 154 without executing the auto parking control. This may also apply to the following cases: a case where the auto parking control unit 154 determines that the seat belt switch 136 has not detected the unfastened state (NO in S302); and a case where the auto parking control unit 154 determines that the door switch 140 has not detected the open state (NO in S304).

When the malfunction determining unit 156 determines that the seat belt switch 136 is not malfunctioning, the auto parking control unit 154 may execute the auto parking control, on the basis of the detection results derived from the seat belt switch 136 as well as from any other switch, sensor, or equivalent. Meanwhile, when the malfunction determining unit 156 determines that the seat belt switch 136 is malfunctioning, the auto parking control unit 154 may unconditionally refrain from executing the auto parking control.

[Other Implementations]

In the foregoing implementations, described is a non-limiting example in which the seat belt switch 136 and the door switch 140 may respectively serve as the "first detector" and the "second detector", and the auto parking control unit 154 may refrain from executing the auto parking control when the malfunction determining unit 156 determines that the seat belt switch 136 is malfunctioning. However, this is non-limiting. In one alternative implementation, the malfunction determining unit 156 may determine malfunction of any switch, sensor, or equivalent (the "first detector") selected among various switches, sensors, or equivalents provided in the vehicle 100. The "first detector" detects a vehicle state attributed to a behavior of a driver (the "first vehicle state"). When the "first detector" is determined by the malfunction determining unit 156 as malfunctioning, the auto parking control unit 154 may refrain from executing the auto parking control, irrespective of the detection result derived from the "first detector".

The "first detector" may be any switch, sensor, or equivalent that detects a vehicle state, including the door switch 140 and a seating sensor without limitation as well as the seat belt switch 136. The seating sensor may detect that a driver is seated, through detecting whether or not a load applied to the driver's seat 130 upon seating of the driver on the driver's seat 130 following entering of the driver into the vehicle 100 is equal to or greater than a predetermined weight value (i.e., detects whether or not the driver is seated).

The malfunction determining unit 156 may determine that the switch, the sensor, or the equivalent is malfunctioning, on the basis of the following example conditions. In an example of the door switch 140, the malfunction determining unit 156 may determine that the door switch 140 is malfunctioning, on a condition that the malfunction determining unit 156 senses no change in the detection result derived from the door switch 140, during a time period from a timing at which the driver unlocks the door lock of the door 138 at the driver's seat 130 (from a timing at which the driver enters the vehicle 100) up to a timing at which the running speed of the vehicle 100 reaches the predetermined speed. Furthermore, when the door switch 140 is not malfunctioning, the auto parking control unit 154 may execute the auto parking control, on conditions that the detection result derived from any other switch, sensor, or equivalent satisfies a predetermined condition and that the door switch 140 detects the open state. Meanwhile, when the door switch 140 is malfunctioning, the auto parking control unit 154 may refrain from executing the auto parking control, irrespective of the detection result derived from the door switch 140.

In an example of the seating sensor, the malfunction determining unit 156 may determine that the seating sensor is malfunctioning, on a condition that the malfunction determining unit 156 senses no change in a detection result derived from the seating sensor, during a time period from a timing at which the driver unlocks the door lock of the door 138 at the driver's seat 130 (from a timing at which the driver enters the vehicle 100) up to a timing at which the running speed of the vehicle 100 reaches the predetermined speed. Furthermore, when the seating sensor is not malfunctioning, the auto parking control unit 154 may execute the auto parking control, on conditions that the detection result derived from any other switch, sensor, or equivalent satisfies a predetermined condition and that the seating sensor detects the load that is less than the predetermined weight value. Meanwhile, when the seating sensor is malfunctioning, the auto parking control unit 154 may refrain from executing the auto parking control, irrespective of the detection result derived from the seating sensor.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the forgoing implementations of the technology, the situation in which the driver does not want the execution of the auto parking control upon the opening of the door 138 with the seat belt 132 fastened (in the fastened state) may be exemplified by an occasion on which the driver reverses the vehicle 100 with the door 138 open while visually checking in the backward direction. However, the situation is not limited thereto. Non-limiting examples of the situation may include paying money at a gas station or other stations, and receiving goods at a drive-through shop or other shops. Also, the forgoing implementations of the technology may be applicable to a case in which the door switch 140 detects opening and closing of the doors 138 other than the door 138 at the driver's seat 130, to a case in which the driver wears the seat belt 132 while an occupant other than the driver opens the door 138 other than the door 138 at the driver's seat 130 and enters or leaves the vehicle 100, and a case in which the driver wears the seat belt 132 while the occupant other than the driver opens the door 138 other than the door 138 at the driver's seat 130 and loads or unloads baggage on or from the vehicle 100.

According to the implementations of the technology, it is possible to ensure convenience in driving even upon an occurrence of malfunction of a device such as a switch, a sensor, or any other equivalent that detects a state of a vehicle.

The implementations of the technology each may be applied to, for example but not limited to, an automatic transmission that utilizes the shift-by-wire system in which the shift ranges are automatically switched with use of an actuator. In particular, the implementations of the technology each may be applied to, for example but not limited to, a shift-by-wire control device that compulsorily switches any shift range to the parking range in response to a state of a vehicle.

The invention claimed is:

1. A shift-by-wire control device that drives, on a basis of an electrical signal corresponding to a shift range selected by a shift lever, an actuator to perform a shift change, the shift-by-wire control device comprising:
   a first detector that detects a first vehicle state attributed to a behavior of a driver driving a vehicle to be equipped with the shift-by-wire control device;
   a second detector that detects a second vehicle state, the second vehicle state being attributed to a behavior of the driver and being different from the first vehicle state;
   a malfunction determining unit that determines that the first detector is malfunctioning, on a condition that the first detector fails to detect a change in the first vehicle state,
   an auto parking control unit that executes an auto parking control irrespective of the shift range selected by the shift lever, on conditions that a detection result derived from the first detector and a detection result derived from the second detector satisfy respective predetermined conditions, and refrains from executing the auto parking control on a condition that the first detector is determined by the malfunction determining unit as malfunctioning, the auto parking control allowing the shift range to be switched to a parking range.

2. The shift-by-wire control device according to claim 1, wherein
   the first detector comprises a seat belt switch that detects a fastened state of a seat belt by the driver,
   the second detector comprises a door switch that detects an open state and a closed state of a door of the vehicle, and
   the malfunction determining unit determines that the seat belt switch is malfunctioning, on a condition that the malfunction determining unit senses no change in the detection result derived from the seat belt switch, during a time period from a timing at which the driver enters the vehicle up to a timing at which a running speed of the vehicle reaches a predetermined speed.

* * * * *